US009489639B2

(12) United States Patent
Shotton et al.

(10) Patent No.: US 9,489,639 B2
(45) Date of Patent: Nov. 8, 2016

(54) MEMORY FACILITATION USING DIRECTED ACYCLIC GRAPHS

(71) Applicant: Microsoft Technology Licensing, LLC, Redmond, WA (US)

(72) Inventors: Jamie Daniel Joseph Shotton, Cambridge (GB); Toby Sharp, Cambridge (GB); Pushmeet Kohli, Cambridge (GB); Reinhard Sebastian Bernhard Nowozin, Cambridge (GB); John Michael Winn, Cambridge (GB); Antonio Criminisi, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 314 days.

(21) Appl. No.: 14/079,394

(22) Filed: Nov. 13, 2013

(65) Prior Publication Data

US 2015/0134576 A1     May 14, 2015

(51) Int. Cl.
*G06N 5/00* (2006.01)
*G06N 99/00* (2010.01)
*G06K 9/00* (2006.01)
*G06K 9/62* (2006.01)

(52) U.S. Cl.
CPC ......... *G06N 99/005* (2013.01); *G06K 9/00369* (2013.01); *G06K 9/6257* (2013.01); *G06K 9/6282* (2013.01); *G06N 5/003* (2013.01)

(58) Field of Classification Search
CPC .................................................. G06N 5/003
USPC ......................................................... 706/12
See application file for complete search history.

(56) References Cited

U.S. PATENT DOCUMENTS

| 6,546,379 | B1 | 4/2003 | Hong et al. |
| 7,320,000 | B2 | 1/2008 | Chitrapura et al. |
| 7,320,002 | B2 | 1/2008 | Chickering |
| 8,229,221 | B2 | 7/2012 | Le Roux et al. |

OTHER PUBLICATIONS

Peterson et al ("Reducing Decision Tree Ensemble Size Using Parallel Decision DAGs" 2009).*
O'Callaghan et al ("Streaming-Data Algorithms for High-Quality Clustering" IEEE 2002).*
Toby Sharp ("Implementing Decision Trees and Forests on a GPU" 2008).*
Chen, et al., "An Improved DAG-SVM for Multi-class Classification", in 5th International Conference on Natural Computation, vol. 1, Aug. 14, 2009, 3 pages.

(Continued)

*Primary Examiner* — Lut Wong
(74) *Attorney, Agent, or Firm* — Tom Wing; Micky Minhas; Lee & Hayes PLLC

(57) ABSTRACT

Memory facilitation using directed acyclic graphs is described, for example, where a plurality of directed acyclic graphs are trained for gesture recognition from human skeletal data, or to estimate human body joint positions from depth images for gesture detection. In various examples directed acyclic graphs are grown during training using a training objective which takes into account both connection patterns between nodes and split function parameter values. For example, a layer of child nodes is grown and connected to a parent layer of nodes using an initialization strategy. In examples, various local search processes are used to find good combinations of connection patterns and split function parameters.

20 Claims, 11 Drawing Sheets

(56) References Cited

OTHER PUBLICATIONS

Nijs, Joost De, "Decision DAGs—A New Approach", Aug. 26, 2013, Available at: http://cs.brown.edu/research/pubs/theses/masters/2011/denijs.pdf.

Aiolli, et al., "Efficient Kernel-based Learning for Trees", in IEEE Symposium on Computational Intelligence and Data Mining, Mar. 1, 2007, 8 pages.

Granitzer, Michael, "Hierarchical Text Classification using Methods from Machine Learning", A Master's Thesis at Graz University of Technology, Oct. 27, 2003, 104 pages.

Nottingham, Alastair, "GPF: A Framework for General Packet Classification on GPU Co-Processors", A Doctoral Dissertation, Rhodes University, Oct. 2011, 193 pages.

Benbouzid, et al., "MDDAG: Learning Deep Decision DAGs in a Markov Decision Process Setup", in NIPS Workshop on Deep Learning and Unsupervised Feature Learning, Dec. 16, 2011, 9 pages.

Kohavi, et al., "Oblivious Decision Trees, Graphs, and Top-Down Pruning", in Proceedings of the 14th International Joint Conference on Artificial Intelligence, vol. 2, Aug. 20, 1995, 7 pages.

U.S. Appl. No. 13/860,515, Kohli, et al., "Image Labeling Using Geodesic Features", filed Apr. 10, 2013.

U.S. Appl. No. 13/528,876, Criminisi, et al., "Semi-Supervised Random Decision Forests for Machine Learning", filed Jun. 21, 2012.

U.S. Appl. No. 13/528,866, Criminisi, et al., "Density Estimation and/or Manifold Learning", filed Jun. 21, 2012.

Amit, et al., "Randomized Inquiries about Shape; An Application to Handwritten Digit Recognition", in Technical Report 401, Department of Statistics, University of Chicago, Nov. 1994, 27 pages.

Banerjee, et al., "Clustering with Bregman Divergences", in Journal of Machine Learning Research, vol. 6, Oct. 2005, 45 pages.

Benbouzid, et al., "Fast Classification using Sparse Decision DAGs", in Proceedings of the 29th International Conference on Machine Learning, Jun. 26, 2012, 8 pages.

Bennett, et al., "Enlarging the Margins in Perceptron Decision Trees", in Journal of Machine Learning, vol. 41, Issue 3, Dec. 2000, 19 pages.

Breiman, Leo, "Random Forests", in Journal of Machine Learning, vol. 45, Issue 1, Oct. 1, 2001, 28 pages.

Chipman, et al., "Bayesian CART Model Search", in Journal of the American Statistical Association, vol. 93, Issue 443, Sep. 1998, 26 pages.

Elomaa, et al., "On the Practice of Branching Program Boosting", in Proceedings of the 12th European Conference on Machine Learning, Sep. 5, 2001, 12 pages.

Everingham, et al., "The PASCAL Visual Object Classes (VOC) Challenge", Published on: Oct. 18, 2008, Available at: http://pascallin.ecs.soton.ac.uk/challenges/VOC/voc2007/index.html.

Hyafil, et al., "Constructing Optimal Binary Decision Trees is NP-Complete",in Information Processing Letters, vol. 5, Issue 1, May 1976, 3 pages.

Kohavi, et al., "Oblivious Decision Trees, Graphs, and Top-Down Pruning", in Proceedings of the Fourteenth International Joint Conference on Artificial Intelligence, Aug. 20, 1995, 7 pages.

Kontschieder, et al., "GeoF: Geodesic Forests for Learning Coupled Predictors", in Proceedings of the Computer Vision and Pattern Recognition, Jun. 2013, 8 pages.

Lepetit, et al., "Keypoint Recognition using Randomized Trees", in IEEE Transactions on Pattern Analysis and Machine Intelligence, vol. 28, Issue 9, Sep. 2006, 15 pages.

Murthy, Kolluru Venkata Sreerama, "On Growing Better Decision Trees from Data", in PhD Dissertation, Johns Hopkins University, Oct. 24, 1995, 297 pages.

Oliveira, Arlindo L., "Using the Minimum Description Length Principle to Infer Reduced Ordered Decision Graphs", in Journal of Machine Learning, Oct. 1996, 30 pages.

Oliver, Jonathan J., "Decision Graphs—An Extension of Decision Trees", in Technical Report 92/173, Department of Computer Science, Monash University, 1992.

Peterson, et al., "Reducing Decision Trees Ensemble Size using Parallel Decision DAGs", in International Journal on Artificial Intelligence Tools, vol. 18, Issue 4, Jul. 30, 2009, 8 pages.

Platt, et al., "Large Margin DAGs for multiclass Classification", in Advances in Neural Information Processing Systems, Nov. 29, 2000, 7 pages.

Quinlan, J. R., "Induction of Decision Trees", in Journal of Machine Learning, vol. 1, Issue 1, Mar. 1, 1986, 26 pages.

Shotton, et al., "Efficient Human Pose Estimation from Single Depth Images", in IEEE Transactions on Pattern Analysis and Machine Intelligence, Oct. 26, 2012, 21 pages.

S. Gould, R. Fulton, and D. Koller. Decomposing a scene into geometric and semantically consistent regions. In Proc. IEEE ICCV, 2009.

"International Search Report and Written Opinion Issued in PCT Patent Application No. PCT/US2014/065098", Mailed Date: Mar. 6, 2015, 11 Pages.

Tapio Elomaa et al: "On the Practice of 1-10 Branching Program Boosting" in: "Lecture Notes in Computer Science", Jan. 1, 2001, Springer Berlin Heidelberg, Berlin, Heidelberg.

Arlindo L Oliveira et al: "Using the Minimum Description Length Principle to Infer Reduced Ordered Decision Graphs", Machine Learning, Kluwer Academic Publishers—Plenum Publishers, NE, vol. 25, No. 1, Oct. 1, 1996, pp. 23-50.

Adam H. Peterson et al: "Reducing Decision Tree Ensemble Size Using Parallel Decision DAGs", International Journal on Artificial Intelligence Tools, vol. 18, No. 04, Jul. 30, 2009, pp. 613-620.

S A Solla et al: "Large Margin DAGs for Multiclass Classification", Jan. 1, 2000, pp. 547-553, URL: http://research.microsoft.com/pubs/68541/dagsvm.pdf.

Jonathan J Oliver: "Decision Graphs: An Extension of Decision Trees", AI and Statistics, Jan. 1, 1992, pp. 1-13, URL: http://odtn.free.fr/graphes.pdf.

"Second Written Opinion Issued in PCT Application No. PCT/US2014/065098", Mailed Date: Oct. 5, 2015, 4 Pages.

International Preliminary Report on Patentability Issued in PCT Application No. PCT/US2014/065098, mailed Feb. 12, 2016, 5 pages.

* cited by examiner

MEMORY FACILITATION USING DIRECTED ACYCLIC GRAPHS

BACKGROUND

Systems for gesture recognition, object recognition, automatic organ detection and other tasks have been developed which use machine learning technology comprising random decision forests. Relatively large amounts of memory are required at training and test times and this makes it extremely difficult to deploy these systems on resource constrained devices such as smart phones or embedded devices.

Large numbers of training examples are typically used to train the decision forests in order to carry out classification tasks such as human body part classification from depth images or gesture recognition from human skeletal data, or regression tasks such as joint position estimation from depth images. The training process is typically time consuming and resource intensive.

There is an ongoing need to improve the accuracy of such machine learning systems and to improve generalization ability. Generalization ability is being able to accurately perform the task in question even for examples which are dissimilar to those used during training. There is also a desire to reduce the amount of time, memory and processing resources needed for training machine learning systems. For example, decision trees grow exponentially with depth and so cannot be trained too deeply on computers with limited memory. Even if large amounts of memory are available during training, the resulting decision trees may be too large to fit at test time on limited memory devices such as smartphones or embedded devices. This in turn limits their accuracy.

The embodiments described below are not limited to implementations which solve any or all of the disadvantages of known machine learning systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Memory facilitation using directed acyclic graphs is described, for example, where a plurality of directed acyclic graphs are trained for gesture recognition from human skeletal data, or to estimate human body joint positions from depth images for gesture detection. In various examples directed acyclic graphs are grown during training using a training objective which takes into account both connection patterns between nodes and split function parameter values. For example, a layer of child nodes is grown and connected to a parent layer of nodes using an initialization strategy. In examples, various local search processes are used to find good combinations of connection patterns and split function parameters.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Common reference numerals are used to designate similar parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image patch classification system, the system described is provided as an example and not a limitation. As those skilled in the art will appreciate, the present examples are suitable for application in a variety of different types of image processing or machine learning systems.

Figure 1:
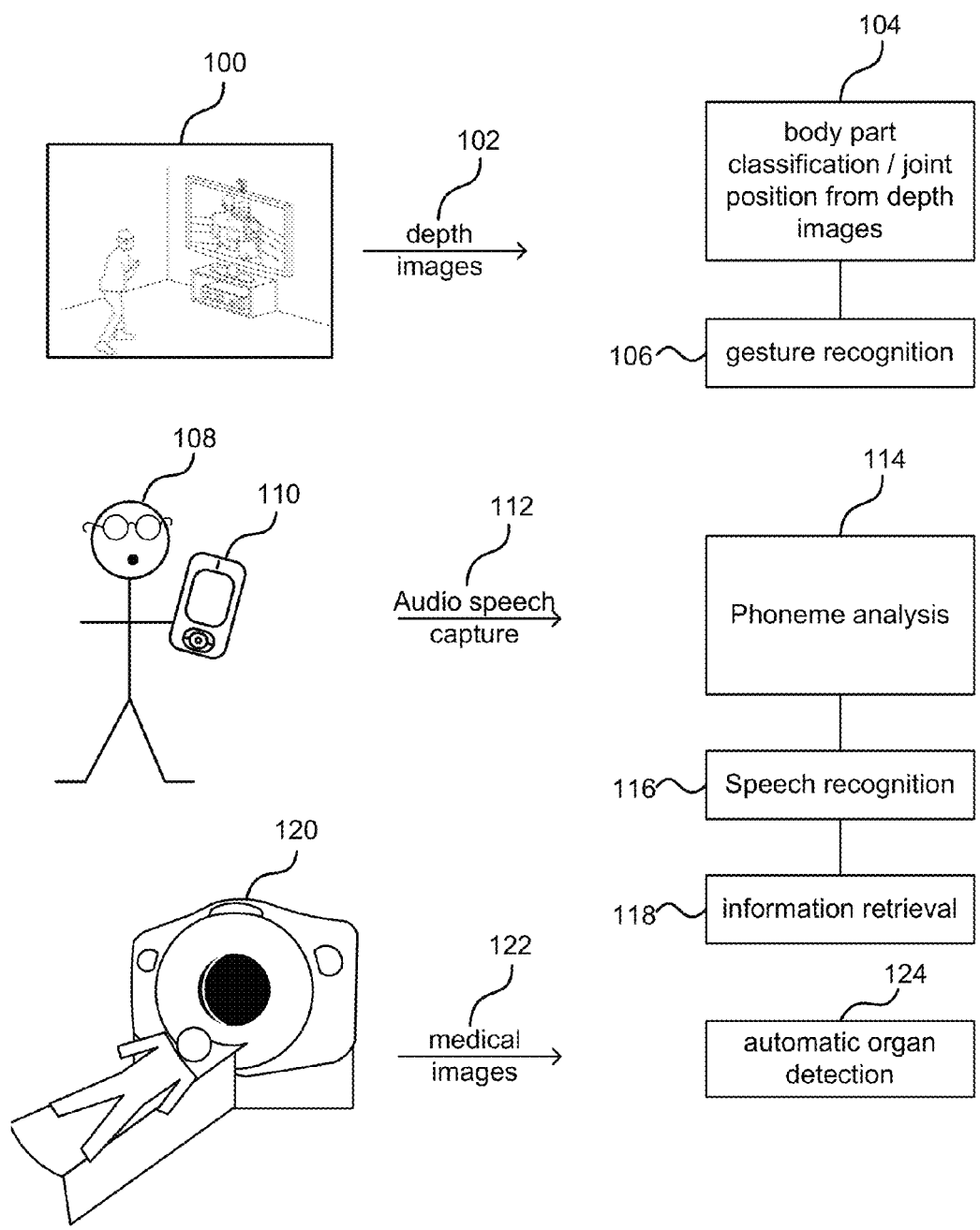
FIG. 1 is a schematic diagram of a plurality of different systems in which a machine learning system with directed acyclic graphs is used.

FIG. 1 is a schematic diagram of a plurality of systems in which a machine learning system with directed acyclic graphs is used. For example, a body part classification or joint position detection system 104 operating on depth images 102. The depth images may be from a natural user interface of a game device as illustrated at 100 or may be from other sources. The body part classification or joint position information may be used to calculate gesture recognition 106.

In another example, a person 108 with a smart phone 110 sends an audio recording of his or her captured speech 112 over a communications network to a machine learning system 114 that carries out phoneme analysis. The phonemes are input to a speech recognition system 116 which uses directed acyclic graphs. The speech recognition results are used for information retrieval 118. The information retrieval results may be returned to the smart phone 110.

In another example medical images 122 from a CT scanner 120, MRI apparatus or other device are used for automatic organ detection 124.

In the examples of FIG. 1 a machine learning system using directed acyclic graphs is used for classification or regression. This gives better accuracy and/or generalization performance as compared with previous systems using equivalent amounts of computing resources and training time. The systems are also workable where memory resources are limited such as on smart phones or embedded devices.

A directed acyclic graph is a plurality of nodes connected by edges so that there are no loops and with a direction specified for each edge. An example of a directed acyclic graph is a binary tree where some of the internal nodes are merged together. A more formal definition of a DAG specifies criteria for in-degrees and out-degrees of nodes of the graph. An in-degree is the number of edges entering a node. An out-degree is a number of edges leaving a node. In some of the examples described herein rooted DAGs are used. A rooted DAG has one root node with in-degree 0; a plurality of split nodes with in-degree greater than or equal to 1 and out-degree 2; and a plurality of leaf nodes with in-degree greater than or equal to 1. As a result of this topology a DAG comprises multiple paths from the root to each leaf. In contrast a random decision tree comprises only one path to each leaf.

In the case of image processing, image elements of an image may be pushed through a DAG in a process whereby a decision is made at each split node. The decision may be made according to characteristics of the image element and characteristics of test image elements displaced therefrom by spatial offsets specified by parameters at the split node. At a split node the image element proceeds to the next level of the tree down a branch chosen according to the results of the decision. During training, parameter values are learnt for use at the split nodes and data is accumulated at the leaf nodes. For example, distributions of labeled image elements are accumulated at the leaf nodes.

Other types of examples may be used rather than images. For example, phonemes from a speech recognition preprocessing system, or skeletal data produced by a system which estimates skeletal positions of humans or animals from images. In this case test examples are pushed through the DAG. A decision is made at each split node according to characteristics of the test example and of a split function having parameter values specified at the split node.

The examples comprise sensor data, such as images, or features calculated from sensor data, such as phonemes or skeletal features.

An ensemble of DAGs may be trained and is referred to collectively as a jungle. At test time, image elements (or other test examples) are input to the trained jungle to find a leaf node of each DAG. Data accumulated at those leaf nodes during training may then be accessed and aggregated to give a predicted regression or classification output.

Figure 2:
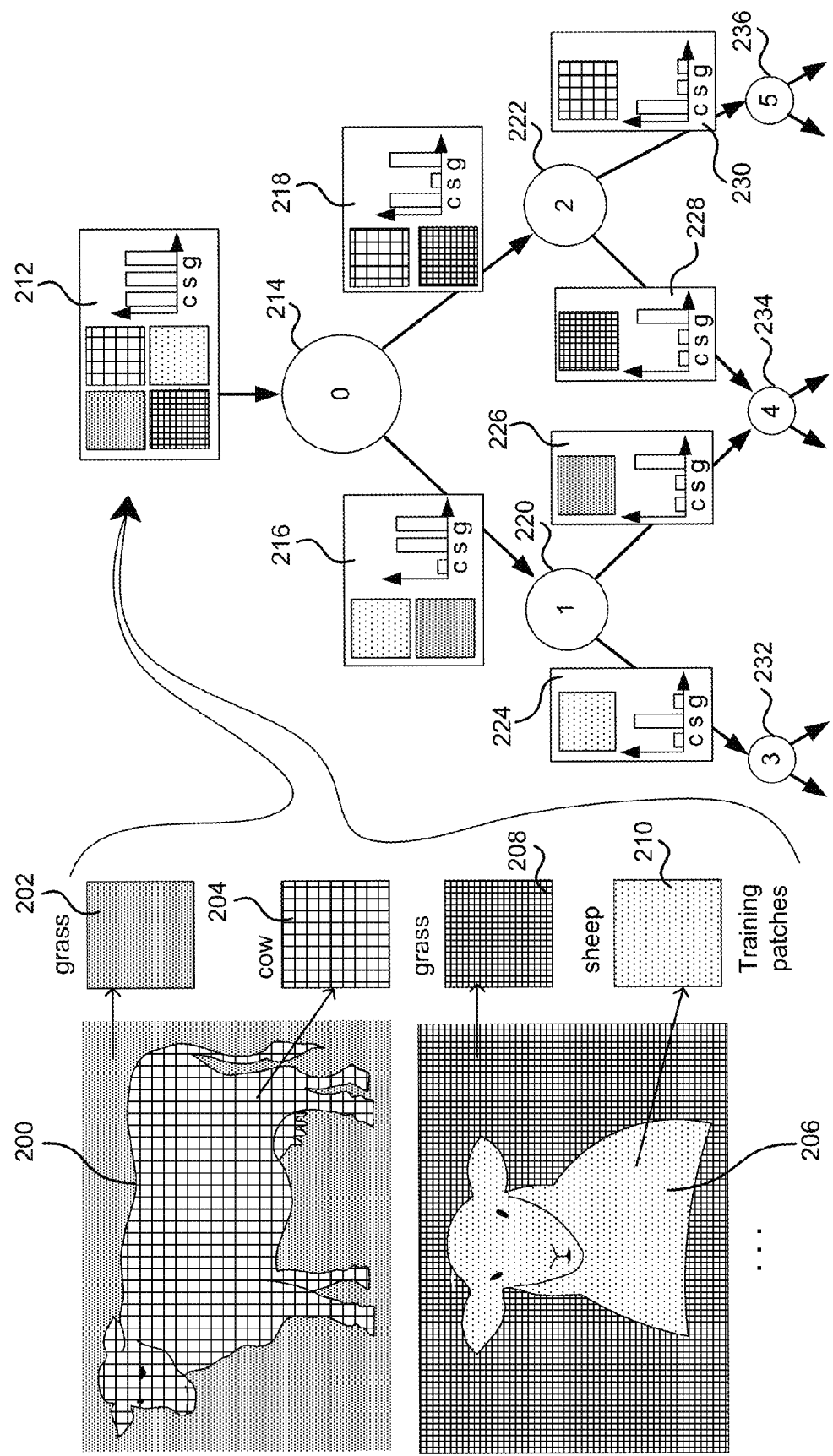
FIG. 2 is a schematic diagram of a directed acyclic graph used to classify image patches from two photographs as belonging to grass, cow or sheep classes.

FIG. 2 is a schematic diagram of a directed acyclic graph used to classify image patches from two photographs as belonging to grass, cow or sheep classes. A photograph of a cow 200 standing in a grassy field is represented schematically in FIG. 2. A photograph of a sheep 206 sitting in a different grassy field is also represented schematically in FIG. 2. Four image patches 202, 204, 208, 210 are taken from the photographs and are input to a trained DAG for classification as belonging to grass, cow or sheep classes. The image patches have different color, intensity and texture from one another. The image patch 202 from the grass in the cow photograph is a different from the image patch 208 from the grass in the sheep photograph.

The image patches are input to a root node 214 of the DAG as indicated at 212. A split function at the root node is applied to the image patches and results in the sheep patch 210 and the grass patch 202 from the cow photograph 202 being input to node 220 as indicated at 216. The cow patch 204 and the sheep grass patch 208 are input to node 222 as indicated at 218. FIG. 2 shows a histogram at each of the split nodes. These are normalized histograms of the training labels reaching these nodes. Split functions at each of split nodes 220 and 222 are applied. This results in the sheep patch reaching node 232 as indicated at 224 and the cow patch reach node 236 as indicated at 230. Both the grass patches reach node 234 as indicated at 226 and 228. In this way using DAGs instead of trees reduces the number of nodes and has been found to give better generalization. For example, differently colored patches of grass are merged together into node 234 because of similar class statistics. This may encourage generalization by representing the fact that grass may appear as a mix of yellow and green. However, it is not straightforward to configure the topology of the DAG in order to achieve accurate results and increased generalization. For example, how can suitable candidate nodes be identified for merging in a simple and effective manner? Training a random decision tree and subsequently post-processing the tree to merge nodes and create a DAG is time consuming, complex, and produces a result which is not as accurate as desired and for which generalization may be poor.

Figure 3:
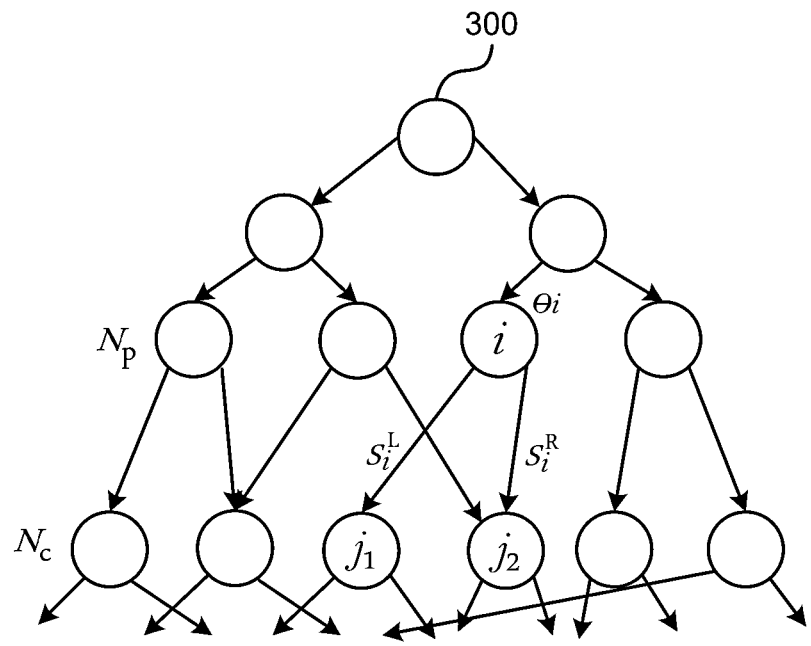
FIG. 3 is a schematic diagram of a directed acyclic graph.

More detail about the structure of a DAG and about notation used to describe a DAG in this document is now given. FIG. 3 is a schematic diagram of a rooted DAG having root node 300 and then two layers of nodes in a binary tree format. A third layer of nodes comprises six nodes rather than eight which would be required for a binary tree format. The layer of four nodes may be considered a layer or set of parent nodes $N_p$. The layer of six nodes may be considered a layer or set of child nodes $N_c$. The symbol $\theta_i$ is used herein to denote the parameters of the split feature function f for parent node i. The symbol $S_i$ is used herein to denote the set of labeled training instanced (x,y) that reach node i. The symbol $l_i$ is used herein to denote the current assignment of the left outwards edge from parent node i to a child node. Thus $l_i$ is a member of the set of child nodes $N_c$. The symbol $r_i$ is used herein to denote the current assignment of the right outward edge from parent node i to a child node. Thus $r_i$ is a member of the set of child nodes.

It is recognized herein, that rather than post-processing a DAG to find candidate nodes for merging, a principled way of forming a DAG topology and split node functions is to achieve this as an integral part of training. In various examples, a new training objective is used, which takes into account both topology of the DAG and split node functions of the DAG.

Figure 4:
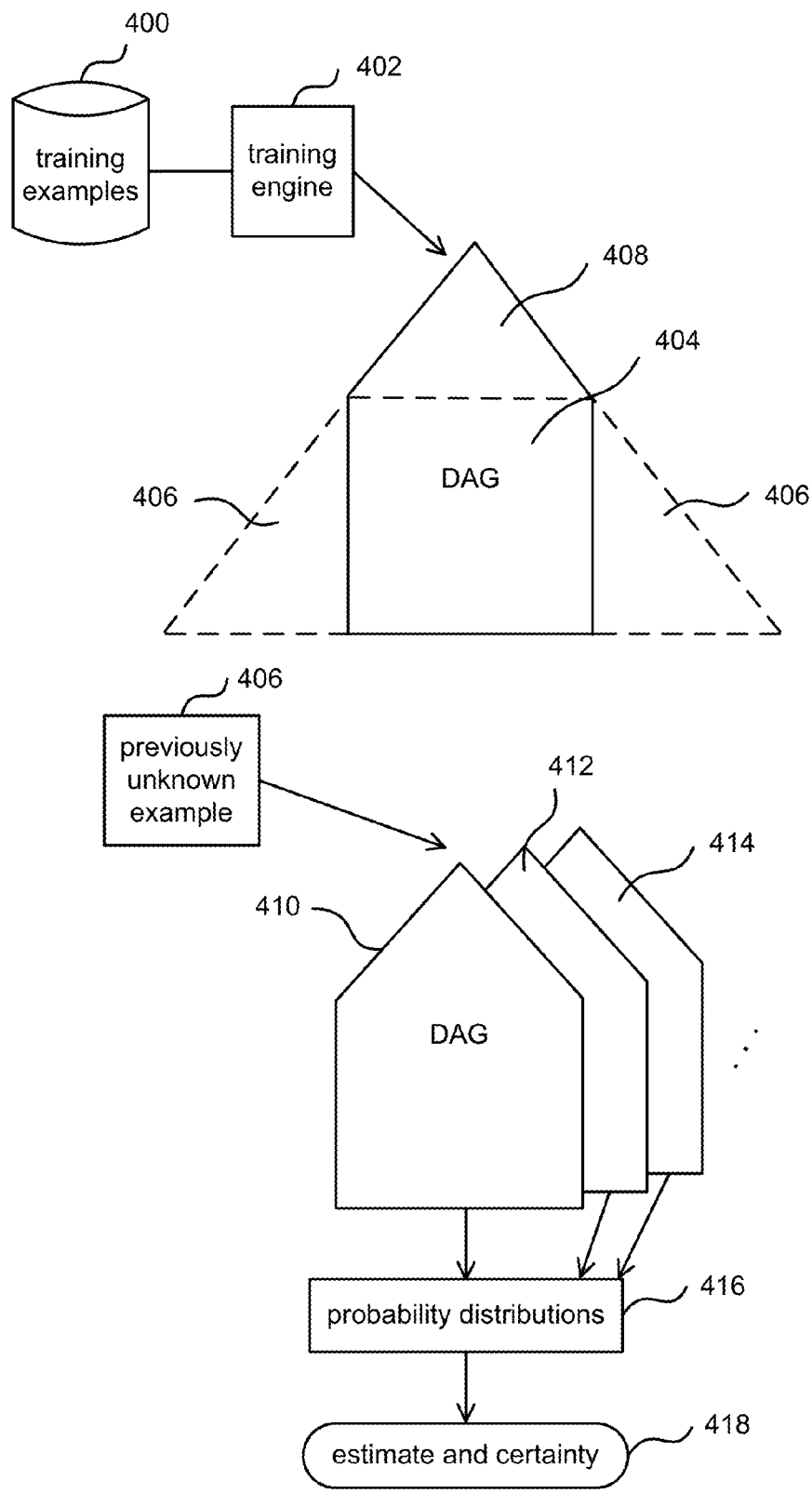
FIG. 4 is a schematic diagram of training examples used to train a directed acyclic graph, and of a jungle of directed acyclic graphs being used at test time.

FIG. 4 is a schematic diagram of training examples 400 used to train a directed acyclic graph 404, and of a jungle of directed acyclic graphs 410, 412, 414 being used at test time on a previously unknown example 406. Training examples 400 comprising many labeled training examples (such as images in some embodiments) are available to a training engine 402. The labeled training examples are appropriate for the particular task the DAG is to be trained for. For example, in the example of FIG. 2 the training images comprise photographs of animals where image patches of the photographs are labeled according to which of a plurality of pre-specified classes they belong to. This is one example only and many other types of labeled training examples may be used depending on the application domain. It is also possible to train using unlabeled training examples in some embodiments or to use a combination of labeled and unlabeled training examples.

During the training process, training examples are passed through the graph and a training objective is used to make choices at split nodes. For example to select split function parameters from a randomly generated set of possible split function parameters at each split node. In the examples described herein the training objective is also used to make choices about the structure of the DAG. This differs from training a random decision forest where the structure of the graph is fixed as a binary tree. By using a training objective that takes into account both the structure of the graph and the split function parameters it is possible to grow a DAG with an appropriate topology for the particular application domain in a principled and effective manner. The resulting DAG has fewer nodes than a corresponding random decision tree as illustrated in FIG. 4 which shows regions 406 where nodes of a random decision tree corresponding to DAG 404 would be. In this way memory requirements are reduced so that the trained DAG is better suited for use on computing devices with memory constraints such as embedded devices, smart phones and others.

Multiple DAGs may be trained using different subsets of training data to give a jungle of DAGs 410, 412, 414. At test time a previously unknown image (or other example) 406 is processed using the jungle of DAGs to select at least one leaf node of each DAG. Probability distributions 416 associated with the selected leaf nodes are accessed. These probability distributions 416 have been formed during the training phase. The probability distributions 416 are aggregated to calculate an estimate or prediction 418 together with a certainty of that estimate or prediction. For example, the prediction is a prediction of class membership in the example of FIG. 2.

It is not straightforward to develop a training objective which takes into account both the structure of the graph and the split function parameters and which is workable (may be calculated and used in an effective manner which produces workable results). In various examples described herein a training process is used which grows internal layers of the DAG one at a time in a manner such that layers which have already been grown do not change their topology when a new layer is being grown. This is achieved by making the training objective take into account topology of the layer being grown with respect to the previous layer. This limits the number of potential DAG arrangements that need to be assessed. In other embodiments training objectives which take into account more than two layers of the DAG, or which enable one or more layers which have already been grown to change their topology may be used.

In some examples a first few layers of a graph are trained and grown as a random decision tree (as indicated at 408 in FIG. 4) and after a specified number of layers is reached the training process moves into a DAG training process. However, this is not essential. It is also possible to use only a DAG training process.

Figure 5:
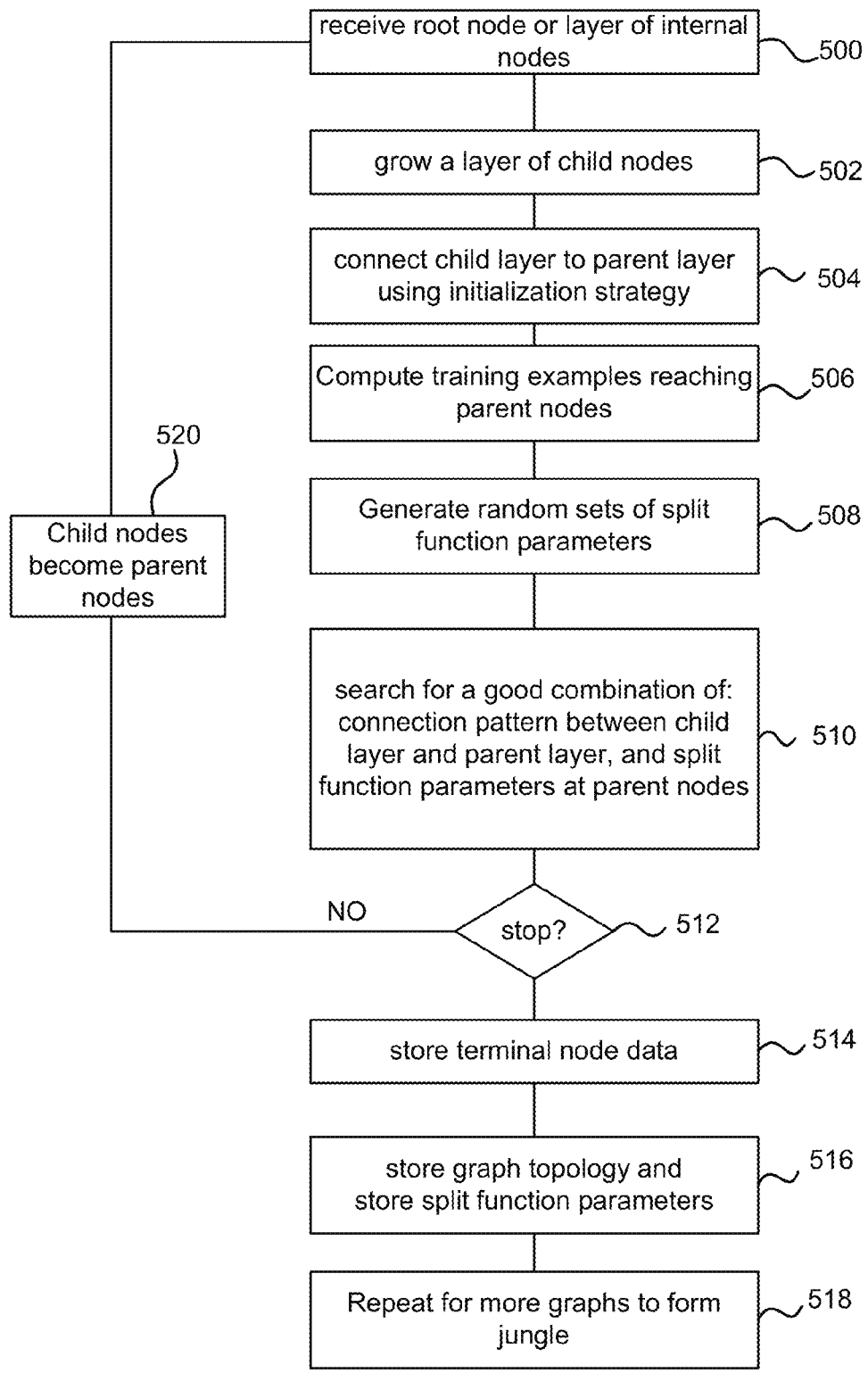
FIG. 5 is a flow diagram of a method of training a directed acyclic graph.

FIG. 5 is a flow diagram of a process for growing and training a DAG.

A labeled ground-truth training set is created available. In example a large database of photographs of animals may be used for classification task described above with reference to FIG. 2.

The number of graphs to be used in the jungle is selected. During the training process the number of graphs is fixed. In an example the number of graphs is three but other values may also be used. The graphs may be trained in parallel or separately.

The root node is considered as a layer of parent nodes (in this case with one parent node). The DAG training engine grows 502 a layer of child nodes from the parent node layer. This is done by selecting a number of nodes to be in the child layer. For example, the number may be pre specified according to the number of layers in the graph and/or according to the number of nodes in the previous layer. It is found that smaller values of M (the number of nodes being added) give improved accuracy whilst keeping memory constant, but must be trained deeper.

The DAG training engine connects 504 the child layer to the parent layer using an initialization strategy. A variety of different initialization strategies may be used. Two examples are discussed with reference to FIGS. 6 and 7.

The DAG training engine computes 506 the training examples reaching the parent node. In the case of the parent node, this is straightforward as a plurality of training examples are selected to be pushed through the DAG and are known from the training data set. As more layers are grown (internal layers of the DAG) the training engine applies split functions to make decisions about which training examples reach which nodes of the parent layer.

The DAG training engine generates 508 random sets of split function parameters for the parent nodes. These are used to select split function parameter values from during an optimization process as described below.

In the case of images, the split function parameters may comprise a plurality of features and a spatial offset value. The spatial offset value is in the form of a two- or three-dimensional displacement. In other examples, the parameters can further comprise one or more additional randomly generated spatial offset values.

More generally, the examples comprise feature vectors holding data calculated from images or other sensor data. For example, a feature vector may hold skeletal data computed from depth images. In another example, a feature vector may hold speech features computed from captured sound. The split functions may be linear or non-linear functions of subsets of a feature vector. For example, to look up a particular element of a skeletal feature vector or to combine multiple elements of the feature vector.

The DAG training engine searches 510 for a good combination of: connection pattern between child layer and parent layer, and split function parameter values at parent nodes. Various different ways of searching may be used. Two local search examples are described with reference to FIGS. 8 and 9. More detail about the training objective is given below.

An objective function E associated with a current (parent) level of a DAG is considered herein as a function of the set of training instances that reach any child node of the current parent level. The problem of learning the parameters of the DAG may be formulated as a joint minimization of the objective function E over the split function parameters $\{\theta_i\}$ and child assignments $\{l_i\}$, $\{r_i\}$. Child assignments are the identities of the child nodes connected to a given parent node. Thus the task of learning the current level of a DAG may be expressed as:

$$\min_{\{\theta_i\},\{l_i\},\{r_i\}} E(\{\theta_i\},\{l_i\},\{r_i\})$$

In examples where classification tasks are to be completed the training objective may an information gain objective which minimizes a total weighted entropy of instances defined as:

$$E(\{\theta_i\},\{l_i\},\{r_i\})=\Sigma_{j\in N_c}|S_j|H(S_j)$$

Where $S_j$ denotes the set of training instances that reach a child node j and H(S) is the Shannon entropy of the class labels y in the training instances.

In examples where regression tasks are to be completed the training objective may be an information gain objective which minimizes a non-parametric or parametric differentiable entropy.

Steps 500 to 510 repeat via step 520 in order to grow and train more layers of the DAG until a decision to stop 512 activates. For example, the decision to stop may be based on a specified number of layers being reached. Training data examples which reach the terminals nodes (the node of the lowest layer of the DAG) are stored 514 in association with the terminal nodes they reach. The training data examples may be stored individually or may be stored in aggregated form. The graph topology and split function parameters are also stored 512. The process of FIG. 5 repeats for additional graphs in order to form a jungle of DAGs.

Figure 6:
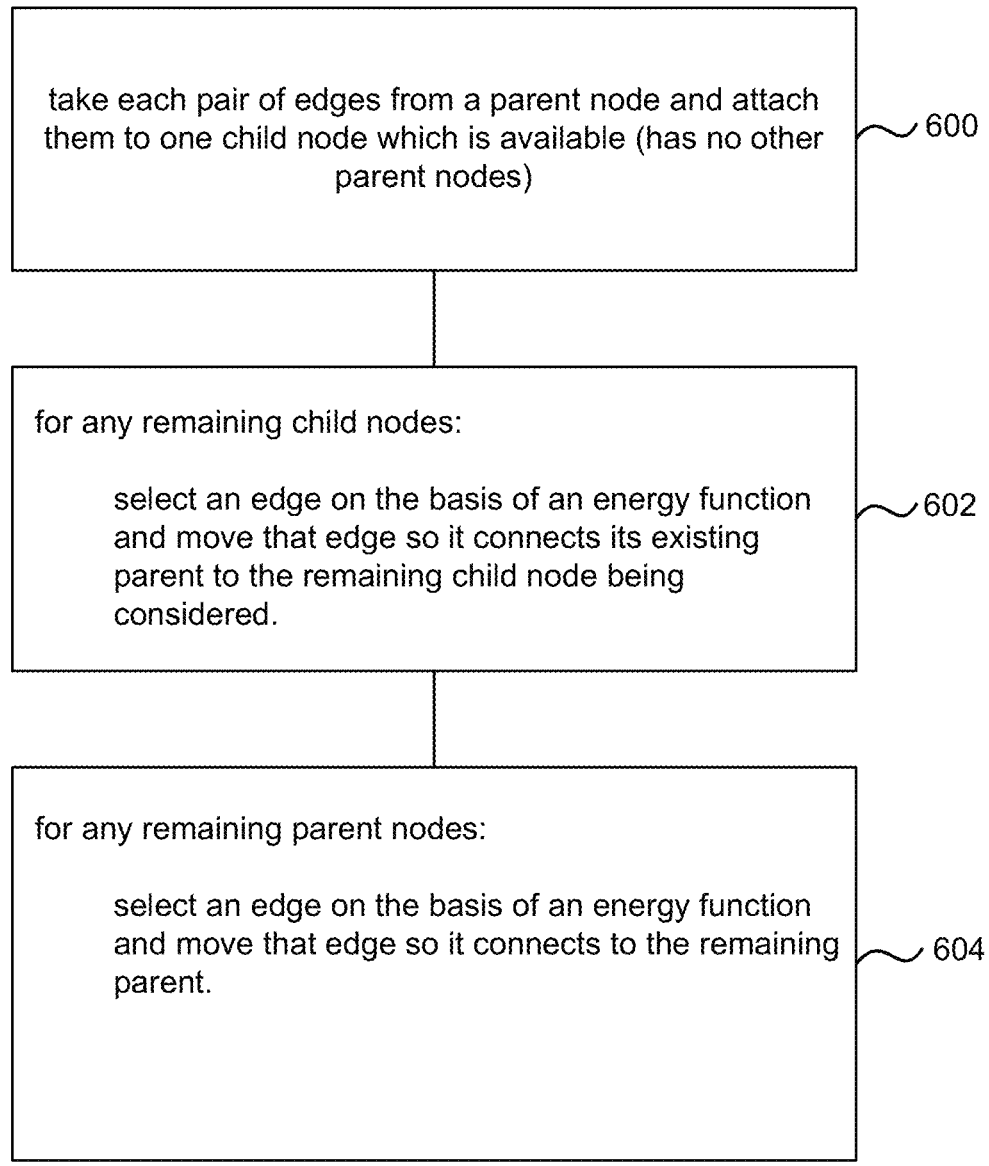
FIG. 6 is a flow diagram of a first initialization process.

FIG. 6 describes a first example of an initialization strategy for initializing connections between the newly grown child nodes and the parent nodes. Each parent node gives out a pair of edges. The pair of edges is attached 600 to one child node which is available because it does not yet have any connected parent node. For any remaining child nodes, one of the existing edges between a parent and another child node is selected 602 and reallocated to the remaining child node. The parent node from which the edge emanates is not changed. The selection of the existing edge may be done on the basis of an energy function related to the split function parameters of the parent nodes. For any remaining parent nodes, one of the existing edges between a child node and another parent is selected 604 and reallocated to the remaining parent node. The child node where the edge ends is otherwise not changed. The selection of the existing edge may be done on the basis of an energy function.

Figure 7:
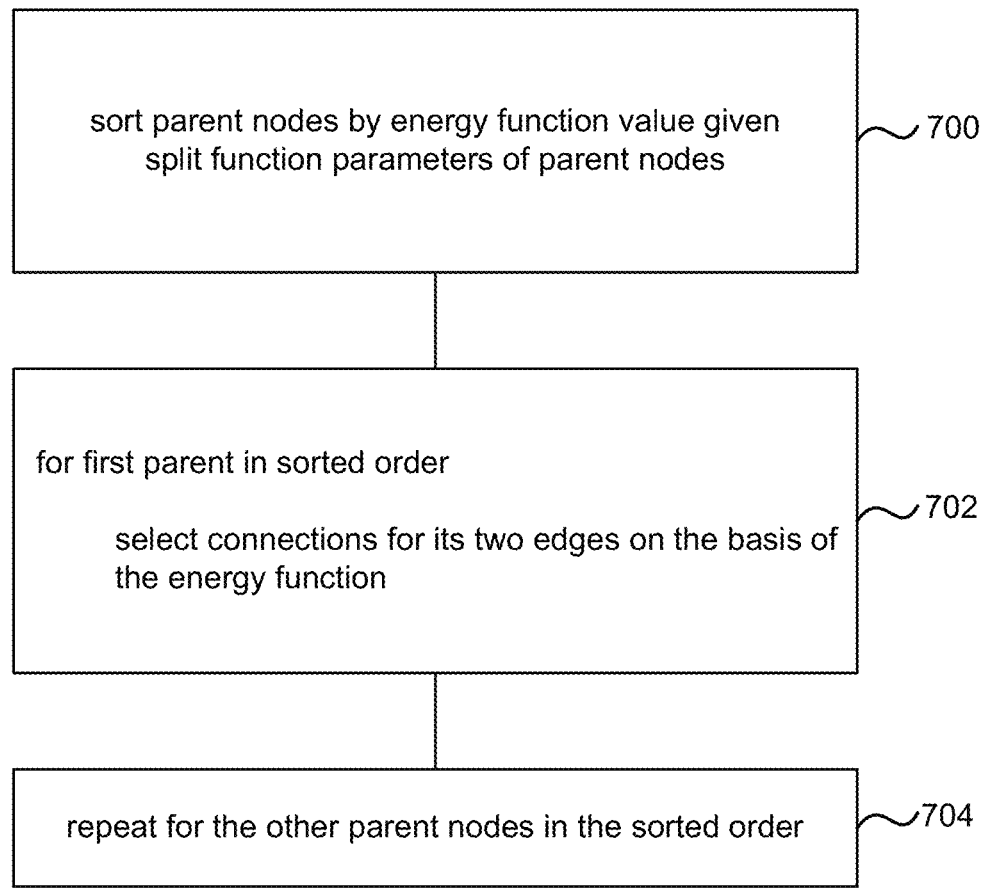
FIG. 7 is a flow diagram of a second initialization process.

FIG. 7 describes a second example of an initialization strategy for initializing connections between the newly grown child nodes and the parent nodes. The parent nodes are sorted 700 according to an energy function value given by the split function parameters of the parent nodes. Edges are then allocated to the parent nodes on the basis of the measure of energy of the parent node, for example, according to the sorted order. For the first parent in the sorted order 702 connections for its two edges are selected (from possible edges which may be made) on the basis of the energy function. This is then repeated 704 for the other parent nodes. When no more empty child nodes are available, any remaining edges from parents are greedily allocated to the child node that minimizes the increase in an energy function. A greedy allocation is one which is executed without taking into account future changes which may impact the current allocation.

Figure 8:
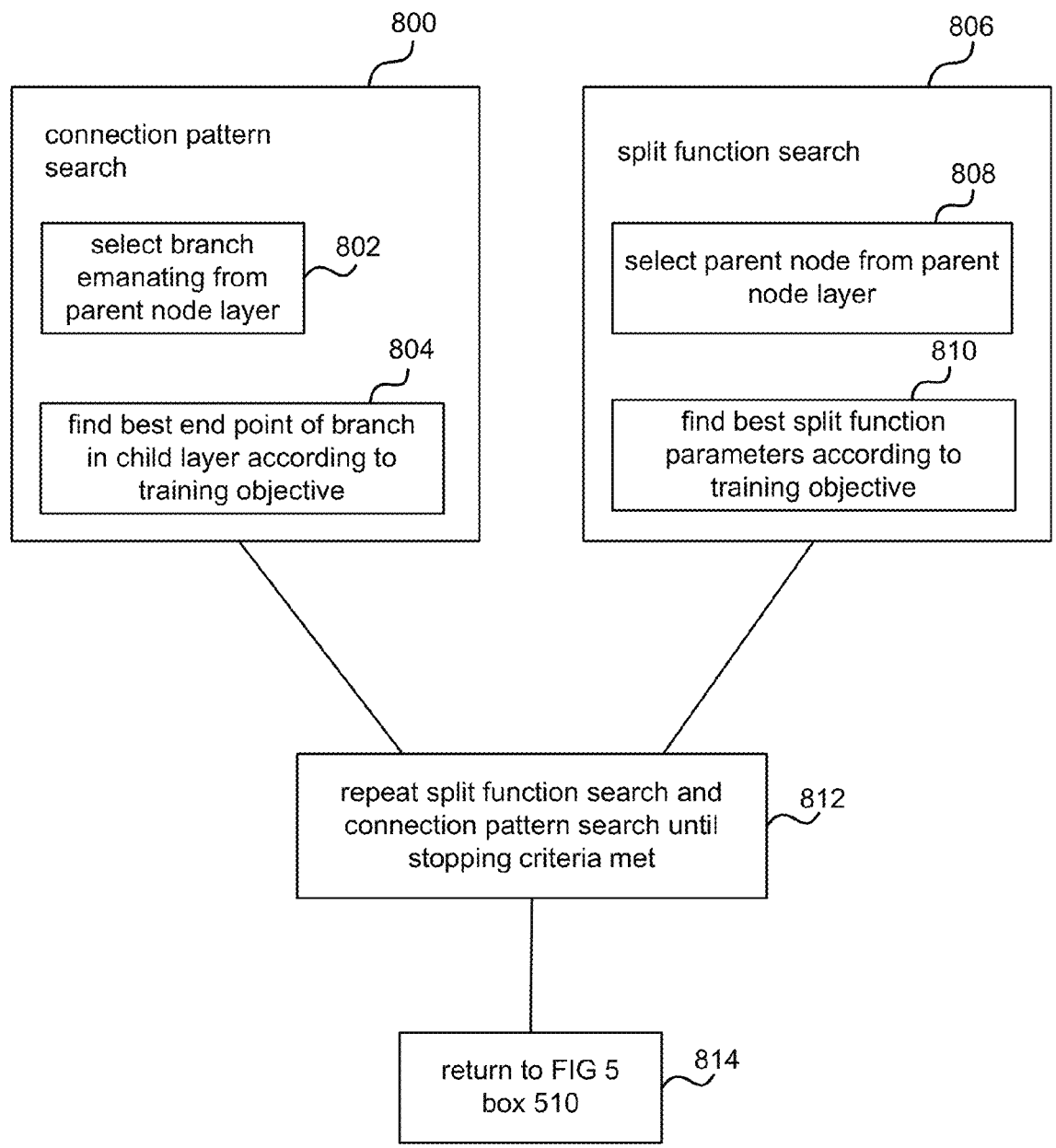
FIG. 8 is a flow diagram of a first optimization method for use as part of the process of FIG. 5.

FIG. 8 is a flow diagram of a first method of searching for good combinations of: connection pattern between child layer and parent layer, and split function parameters at parent nodes. This method is also referred to as LSearch herein. This method starts from an initial assignment of the parameters (split function parameters and connection pattern parameters) given by the initialization above and then alternates (in a random manner in some examples) between two coordinate descent steps until stopping criteria are met.

As illustrated in FIG. 8 a first one of the coordinate descent steps 806 is a split optimization step. It goes over every (or in some cases a randomly selected) parent node k in turn and tries to find the split function parameters $\theta_k$ that minimize the objective function, keeping the connection pattern and the split parameters of all other nodes fixed. Thus a parent node is selected 808 (at random in some examples) from the parent node layer. The best split function parameters (from a randomly generated set of possible split function parameters) for the selected parent node are then found 810. A second one of the coordinate descent steps 800 is a connection pattern search. This process goes over one or more branches emanating from a parent node in turn and tries to redirect it to a child node that would lead to a lower value of the training objective with the split function parameters fixed. A branch emanating from the parent node layer is selected 802. A best end point for the selected branch is found according to the training objective with the split function parameters fixed.

In some examples the split function search process 806 is arranged to enable nodes to bypass a layer, or to become terminal nodes where no suitable split function parameters are found for that node.

The coordinate descent steps alternate until little or no changes to the parameters are made. Other stopping criteria may be used according to memory constraints, time constraints, processing resource constraints or other factors.

Figure 9:
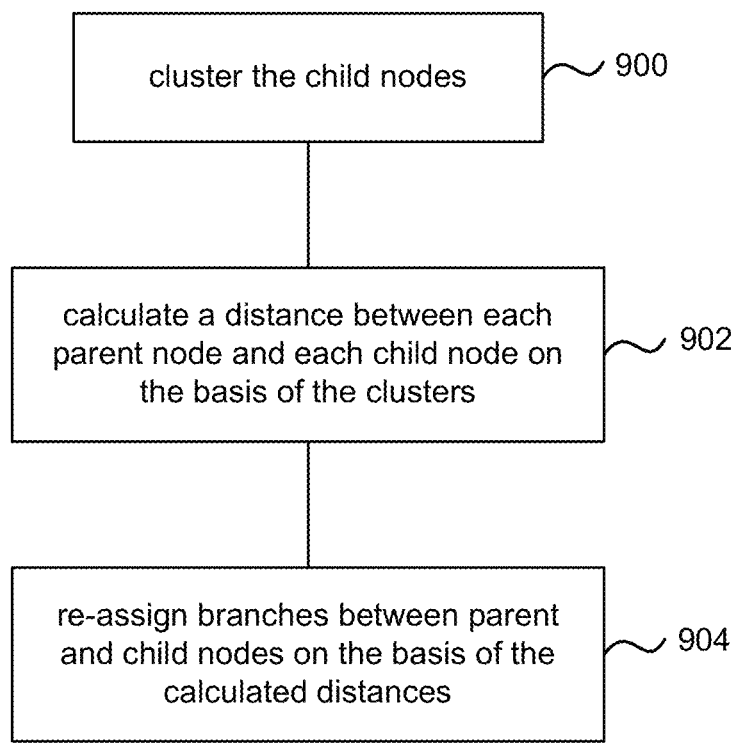
FIG. 9 is a flow diagram of a second optimization method for use as part of the process of FIG. 5.

FIG. 9 is a flow diagram of part of a second method of searching for good combinations of: connection pattern between child layer and parent layer, and split function parameters at parent nodes. This method is referred to as cluster search in this document. The cluster search process comprises replacing the connection pattern search 800 of FIG. 8 by the method of FIG. 9. This gives a more global optimization for the branching variables.

The connection pattern search comprises clustering 900 the child nodes using k-means clustering, clustering based on Bregman divergence or other clustering methods. A Bregman divergence (or distance) generalizes squared Euclidean distance to a more general class of distances. Bregman distances are connected to exponential families of distributions. For example, information about labeled training examples reaching the child nodes are used to compute the clusters.

A distance is calculated 902 between each parent node and each child node on the basis of the clusters. Kullback-Leibler divergence may be used as the calculated distance. Branches are then reassigned 904 between parent and child nodes on the basis of the calculated distances.

For example, histograms of labeled training examples are computed reaching the parent nodes. A temporary layer of temporary child nodes is grown from the parent nodes, with two temporary child nodes branching from each parent node. Histograms of labeled training examples reaching the temporary child nodes are computed. A second layer of child nodes is formed and connected to the temporary child node layer using any of the initialization strategies mentioned above. The second layer of child nodes comprises one child node for each cluster. Each temporary child node is connected to the cluster that it is closest to in terms of a similarity between its histogram and a histogram of the cluster. For example, the similarity may be computed using a Kullback-Leibler divergence or another similarity measure. The histograms of the parent nodes are then updated using the sums of histograms from their respective temporary child nodes. At the end of the process, when the stopping criteria at met at box 812 of FIG. 8, the temporary child nodes are deleted and replaced by direct branches from the parent nodes to the second layer of child nodes, according to the branching patterns of the temporary child nodes.

Figure 10:
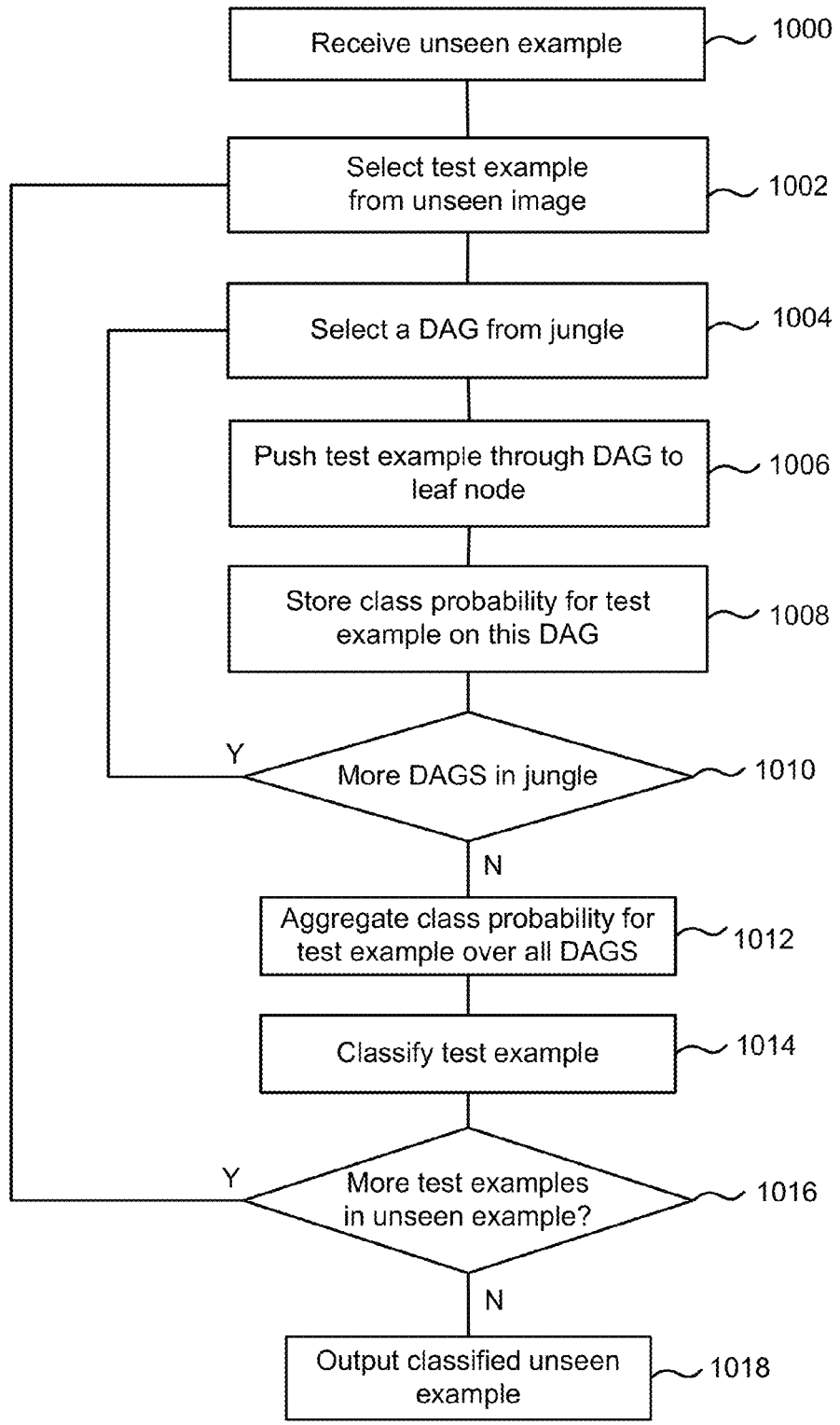
FIG. 10 is a flow diagram of a method of using a trained jungle of directed acyclic graphs.

FIG. 10 is a flow diagram of a method of using a trained jungle of DAGs. In this example the DAGs have been trained for the classification task of FIG. 2. However, the method of FIG. 10 also applies to DAGs trained for other classification or regression tasks.

An unseen depth image is received 1000 at the trained jungle. An image is referred to as 'unseen' to distinguish it from a training image which has the image elements already classified.

An image element from the unseen image is selected 1002 for classification (or regression). A trained DAG from the jungle is also selected 1004. The selected image element is pushed 1006 through the selected DAG such that it is tested against the trained parameters at a node, and then passed to the appropriate child in dependence on the outcome of the test, and the process repeated until the image element reaches a terminal node. Once the image element reaches a terminal node, the probability distribution associated with this terminal node is stored 1008 for this image element.

If it is determined 1010 that there are more DAGs in the jungle, then a new DAG is selected 1004, the image element pushed 1006 through the DAG and the probability distribution stored 1008. This is repeated until it has been performed for all the DAGs in the jungle. Note that the process for pushing an image element through the plurality of DAGs in the jungle can also be performed in parallel, instead of in sequence as shown in FIG. 10.

Once the image element has been pushed through all the DAGs in the jungle, then a plurality of probability distributions have been stored for the image element (at least one from each DAG). These probability distributions are then aggregated 1012 to form an overall probability distribution for the image element. In one example, the overall probability distribution is the mean of all the individual probability distributions from the T different DAGs. This is given by:

$$P(Y(x) = c) = \frac{1}{T}\sum_{t=1}^{T} P_{l_t(x)}(Y(x) = c)$$

Note that methods of combining the DAG posterior probabilities other than averaging can also be used, such as multiplying the probabilities. Optionally, an analysis of the variability between the individual probability distributions can be performed (not shown in FIG. 10). Such an analysis can provide information about the uncertainty of the overall probability distribution. In one example, the entropy can be determined as a measure of the variability.

Once the overall probability distribution is determined, the predicted classification (or regressed value) of the image element is calculated 1014 and stored. The predicted value of the image element is assigned to the image element for future use (as outlined below). In one example, the calculation of a classification c for the image element can be performed by determining the maximum probability in the overall probability distribution (i.e. $P_c = \max_x P(Y(x) = c)$. In addition, the maximum probability can optionally be compared to a threshold minimum value, such that an image element having class c is considered to be present if the maximum probability is greater than the threshold. In one example, the threshold can be 0.5, i.e. the classification c is considered present if $P_c > 0.5$. In a further example, a maximum a-posteriori (MAP) classification for an image element x can be obtained as $c^* = \arg\max_c P(Y(x) = c)$.

It is then determined 1016 whether further unanalyzed image elements are present in the unseen depth image, and if so another image element is selected and the process repeated. Once all the image elements in the unseen image have been analyzed, then predicted values (such as class labels, joint positions, or others depending on the application domain) are obtained for all image elements.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units (GPUs).

Figure 11:
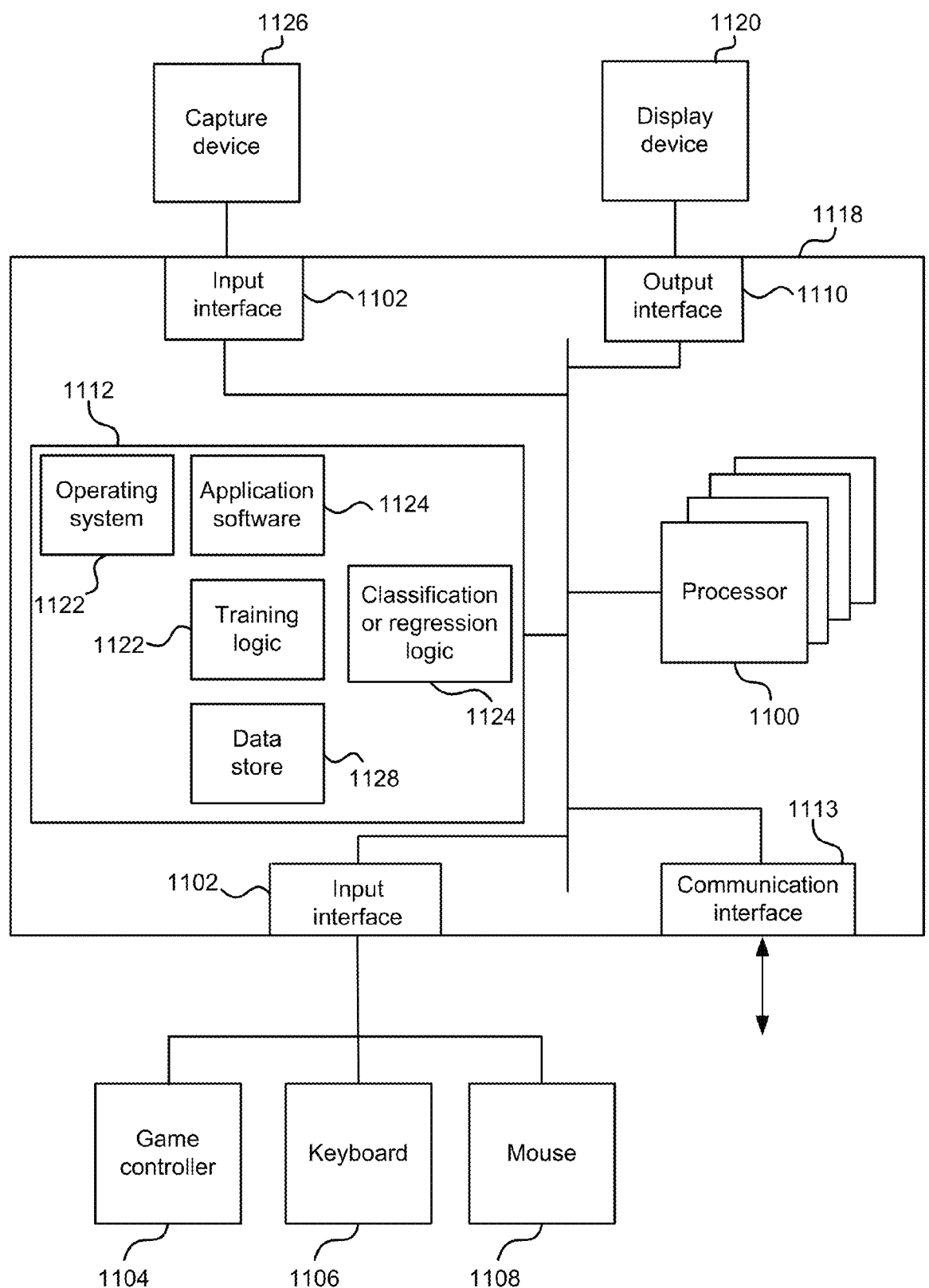
FIG. 11 illustrates an exemplary computing-based device in which embodiments of an image processing system using directed acyclic graphs may be implemented.

FIG. 11 illustrates various components of an exemplary computing-based device 1118 which may be implemented as any form of a computing and/or electronic device, and in which embodiments of an image processing system using directed acyclic graphs may be implemented.

Computing-based device 1118 comprises one or more processors 1100 which may be microprocessors, controllers or any other suitable type of processors for processing computer executable instructions to control the operation of the device in order to train a plurality of directed acyclic graphs and/or use trained directed acyclic graphs for classification or regression tasks applied to images. In some examples, for example where a system on a chip architecture is used, the processors 1100 may include one or more fixed function blocks (also referred to as accelerators) which implement a part of the method of training a directed acyclic graph and/or processing image elements using a trained directed acyclic graph in hardware (rather than software or firmware). Platform software comprising an operating system 1122 or any other suitable platform software may be provided at the computing-based device to enable application software 1124 to be executed on the device. A training logic 1122 is arranged to train one or more directed acyclic graphs and optionally also random decision trees. A data store 1128 holds training images, training objectives, parameters, trained directed acyclic graphs or other data. A classification or regression logic 1124 is arranged to use trained directed acyclic graphs and/or random decision trees to carry out regression or classification tasks with respect to images.

The computer executable instructions may be provided using any computer-readable media that is accessible by computing based device 1118. Computer-readable media may include, for example, computer storage media such as memory 1112 and communications media. Computer storage media, such as memory 1112, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1112) is shown within the computing-based device 1112 it will be appreciated that the storage may be distributed or located remotely and accessed via a network or other communication link (e.g. using communication interface 1113).

The computing-based device 1118 also comprises an input/output controller comprising input interface 1102 and output interface 1110. Output interface 1110 is arranged to output display information to a display device 1120 which may be separate from or integral to the computing-based device 1118. The display information may provide a graphical user interface. The input/output controller is also arranged to receive and process input from one or more devices, such as a user input device 1104, 1106, 1108 (e.g. a mouse, keyboard, game controller) or capture device 1126 such as a camera, microphone or other sensor. In some examples the user input device may detect voice input, user gestures or other user actions and may provide a natural user interface (NUI). This user input may be used to specify training objectives, specify stopping criteria, set parameter values, input training data or for other purposes. In an embodiment the display device 1120 may also act as a user input device if it is a touch sensitive display device. The input/output controller may also output data to devices other than the display device, e.g. a locally connected printing device.

Any of the input/output controller 1102,1110, display device 1120 and the user input device 1104, 1106, 1108 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer implemented method at a machine learning system comprising:
    accessing a plurality of training examples;
    storing a graph of connected nodes at a memory of the machine learning system, the nodes comprising a plurality of split nodes and wherein the nodes have a plurality of split function parameters specifying tests for determining flow of elements through the graph; and
    adding, using a processor, new nodes to the graph by applying a training objective function to elements of the training examples reaching nodes of the graph according to the split function parameters, the adding including:
        adding a layer of child nodes to the graph;
        selecting, by the training objective function, between possible branch assignments between a parent node and child nodes of the layer of child nodes; and
        selecting, by the training objective function, between a randomly generated set of possible split function parameter values.

2. A method as claimed in claim 1 wherein adding new nodes to the graph comprises selecting between possible branch assignments between the new nodes and a single parent layer of nodes of the graph.

3. A method as claimed in claim 1 wherein adding new nodes to the graph comprises alternating between a first search step and a second search step, the first search step being selection of candidate split function parameters and the second step being selection of a candidate connection pattern, the connection pattern including branch assignments between a single parent layer of nodes and the new nodes.

4. A method as claimed in claim 3 wherein adding new nodes to the graph occurs for single ones of the new nodes selected at random, and where the order of the first and second search steps is randomized.

5. A method as claimed in claim 1 wherein selecting between possible branch assignments comprises clustering the new nodes.

6. A method as claimed in claim 5 wherein selecting between possible branch assignments comprises calculating distances between the new nodes and nodes of a parent layer of the graph on the basis of the clusters.

7. A method as claimed in claim 6 comprising reassigning branches between nodes of the parent layer and the new nodes on the basis of the calculated distances.

8. A method as claimed in claim 1 comprising adding new nodes to the graph using an initialization strategy and then reassigning branches between the new nodes and a parent layer of the graph.

9. A method as claimed in claim 8 wherein the initialization strategy comprises allocating branches between the new nodes and a parent layer of the graph on the basis of a measure of parent node energy.

10. A method as claimed in claim 1 wherein adding new nodes comprises selecting a number of child nodes in the child layer on the basis of a total number of layers in the graph.

11. One or more tangible device-readable media with device-executable instructions that, when executed by a computing system, direct the computing system to perform steps comprising: at a machine learning system:
    accessing a plurality of training examples;
    storing a graph of connected nodes at a memory of the machine learning system, the nodes comprising a plurality of split nodes and wherein the nodes have a plurality of split function parameters specifying tests for determining flow of elements through the graph; and
    adding, using a processor, new nodes to the graph by applying a training objective function to elements of the training examples reaching nodes of the graph according to the split function parameters, the adding including:
        selecting, by the training objective function, between possible branch assignments between the new nodes and a single parent layer of nodes of the graph; and
        selecting, by the training objective function, between a randomly generated set of possible split function parameter values to obtain split function parameters for the single parent layer of nodes.

12. A machine learning system comprising:
    an input arranged to access a plurality of training examples;
    a memory storing a graph of connected nodes, the nodes comprising a plurality of split nodes, the split nodes having a plurality of split function parameters specifying tests for determining flow of elements through the graph; and
    a training logic arranged to add new nodes to the graph to form a directed acyclic graph by applying a training objective function which selects between possible connection patterns between nodes of the graph, and also selects between a randomly generated set of possible split function parameter values, the training objective function being applied to elements of the training images reaching nodes of the graph according to the split function parameters.

13. A machine learning system as claimed in claim 12 the training logic arranged to add new nodes to the graph by selecting between possible connection patterns between the new nodes and a single parent layer of nodes of the graph.

14. A machine learning system as claimed in claim 12 the training logic arranged to add new nodes to the graph by alternating between a first search step and a second search step, the first search step being selection of candidate split function parameters and the second step being selection of a candidate connection pattern.

15. A machine learning system as claimed in claim 14 where the order of the first and second search steps is randomized.

16. A machine learning system as claimed in claim 12 wherein the training logic is arranged to select between possible connection patterns by clustering the new nodes.

17. A machine learning system as claimed in claim 16 wherein the training logic is arranged to select between possible connection patterns by calculating distances between the new nodes and nodes of a parent layer of the graph on the basis of the clusters.

18. A machine learning system as claimed in claim 17 wherein the training logic is arranged to reassigning branches between nodes of the parent layer and the new nodes on the basis of the calculated distances.

19. A machine learning system as claimed in claim 12 wherein the training logic is arranged to add new nodes to the graph using an initialization strategy and then reassigning branches between the new nodes and a parent layer of the graph.

20. A machine learning system as claimed in claim 12 the training logic being at least partially implemented using hardware logic selected from any one or more of: a field-programmable gate array, a program-specific integrated circuit, a program-specific standard product, a system-on-a-chip, a complex programmable logic device, a graphics processing unit.

* * * * *